United States Patent
Taki (10) Patent No.: US 11,900,664 B2
(45) Date of Patent: *Feb. 13, 2024

(54) READING SYSTEM, READING DEVICE, READING METHOD, AND STORAGE MEDIUM

(71) Applicant: Kabushiki Kaisha Toshiba, Minato-ku (JP)

(72) Inventor: Toshikazu Taki, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,351

(22) Filed: Aug. 23, 2022

(65) Prior Publication Data

US 2022/0398824 A1 Dec. 15, 2022

Related U.S. Application Data

(60) Division of application No. 16/925,390, filed on Jul. 10, 2020, now Pat. No. 11,455,787, which is a
(Continued)

(30) Foreign Application Priority Data

Feb. 16, 2018 (JP) .................. 2018-026476

(51) Int. Cl.
*G06T 7/00* (2017.01)
*G06V 10/82* (2022.01)
(Continued)

(52) U.S. Cl.
CPC ............ *G06V 10/82* (2022.01); *G06F 18/214* (2023.01); *G06N 3/08* (2013.01); *G06T 5/003* (2013.01);
(Continued)

(58) Field of Classification Search
CPC .... G06V 2201/02; G06V 30/10; G06V 10/82; G06V 20/63; G06V 10/95; G06V 10/993;
(Continued)

(56) References Cited

U.S. PATENT DOCUMENTS

| 7,164,431 B1 | 1/2007 | Chu |
| 10,169,679 B1 | 1/2019 | Kim |

(Continued)

FOREIGN PATENT DOCUMENTS

| JP | 10-74240 A | 3/1998 |
| JP | 11-316794 A | 11/1999 |

(Continued)

OTHER PUBLICATIONS

International Search Report dated Nov. 27, 2018 in PCT/JP2018/035334 filed Sep. 25, 2018, citing documents AB and AQ-AS therein, 1 page.

*Primary Examiner* — Quan M Hua
(74) *Attorney, Agent, or Firm* — Oblon, McClelland, Maier & Neustadt, L.L.P.

(57) ABSTRACT

According to one embodiment, a reading system includes an extractor, a determiner, and a reader. The extractor extracts a candidate image from an input image. The candidate image is a candidate of a portion of the input image in which a segment display is imaged. The determiner uses the candidate image and a mask to calculate a match ratio indicating a certainty of a segment display being included in the candidate image, and determines that the candidate image is an image of a segment display when the match ratio is not less than a threshold. The mask and the threshold are preset.

(Continued)

The reader reads a numerical value displayed in a segment display from the candidate image determined to be an image of a segment display.

15 Claims, 7 Drawing Sheets

Related U.S. Application Data continuation of application No. PCT/JP2018/035334, filed on Sep. 25, 2018.

(51) Int. Cl.
| | | |
|---|---|---|
| *G06T 7/10* | (2017.01) | |
| *G06N 3/08* | (2023.01) | |
| *G06T 5/00* | (2006.01) | |
| *G06F 18/214* | (2023.01) | |
| *G06V 30/146* | (2022.01) | |
| *G06V 30/18* | (2022.01) | |
| *G06V 30/19* | (2022.01) | |
| *G06V 30/10* | (2022.01) | |

(52) U.S. Cl.
CPC .............. *G06T 7/10* (2017.01); *G06V 30/147* (2022.01); *G06V 30/18019* (2022.01); *G06V 30/19173* (2022.01); *G06V 30/10* (2022.01)

(58) Field of Classification Search
CPC ........... G06V 30/153; G06V 30/19173; G06V 30/2504; G06V 30/2528; G06V 10/242; G06V 20/62; G06N 20/00; G06N 3/045; G06N 3/08; G06N 3/02; G06N 3/04; G06T 2207/20084; G06T 11/001; G06T 7/13; G06T 7/60
See application file for complete search history.

(56) References Cited

U.S. PATENT DOCUMENTS

| | | | |
|---|---|---|---|
| 10,198,671 B1* | 2/2019 | Yang | G06V 10/768 |
| 11,455,787 B2* | 9/2022 | Taki | G06V 30/18019 |
| 2014/0055283 A1* | 2/2014 | Ching | G01D 4/002 |
| | | | 340/870.02 |
| 2016/0371557 A1 | 12/2016 | Takahashi | |
| 2017/0234709 A1 | 8/2017 | Mackie | |
| 2017/0345200 A1* | 11/2017 | Furuya | G06T 11/60 |
| 2018/0129173 A1 | 5/2018 | Kusaka | |

FOREIGN PATENT DOCUMENTS

| | | | | |
|---|---|---|---|---|
| JP | 2006-285303 | | 10/2006 | |
| JP | 2008-243103 A | | 10/2008 | |
| JP | 2011-175523 | | 9/2011 | |
| JP | 2011175523 A | * | 9/2011 | |
| JP | 2017-10170 A | | 1/2017 | |
| JP | 2018-81688 A | | 5/2018 | |
| WO | WO-2014203403 A | | 12/2014 | |
| WO | WO-2019023900 A1 | * | 2/2019 | ........... G06K 9/3233 |

\* cited by examiner

READING SYSTEM, READING DEVICE, READING METHOD, AND STORAGE MEDIUM

CROSS-REFERENCE TO RELATED APPLICATIONS

This application is a division of and claims the benefit of priority under 35 U.S.C. § 120 from U.S. application Ser. No. 16/925,390 filed Jul. 10, 2020, which is a continuation of International Application PCT/JP2018/035334 filed Sep. 25, 2018, which claims the benefit of priority under 35 U.S.C. § 119 from Japanese Patent Application No. 2018-026476 filed Feb. 16, 2018, the entire contents of each of which are incorporated herein by reference.

FIELD

Embodiments described herein relate generally to a reading system, a reading device, a reading method, and a storage medium.

BACKGROUND

There is a system that reads a numerical value displayed in a segment display. It is desirable for the system to have high accuracy of reading the numerical value.

DETAILED DESCRIPTION

According to one embodiment, a reading system includes an extractor, a determiner, and a reader. The extractor extracts a candidate image from an input image. The candidate image is a candidate of a portion of the input image in which a segment display is imaged. The determiner uses the candidate image and a mask to calculate a match ratio indicating a certainty of a segment display being included in the candidate image, and determines that the candidate image is an image of a segment display when the match ratio is not less than a threshold. The mask and the threshold are preset. The reader reads a numerical value displayed in a segment display from the candidate image determined to be an image of a segment display.

Various embodiments are described below with reference to the accompanying drawings.

In the specification and drawings, components similar to those described previously or illustrated in an antecedent drawing are marked with like reference numerals, and a detailed description is omitted as appropriate.

Figure 1:
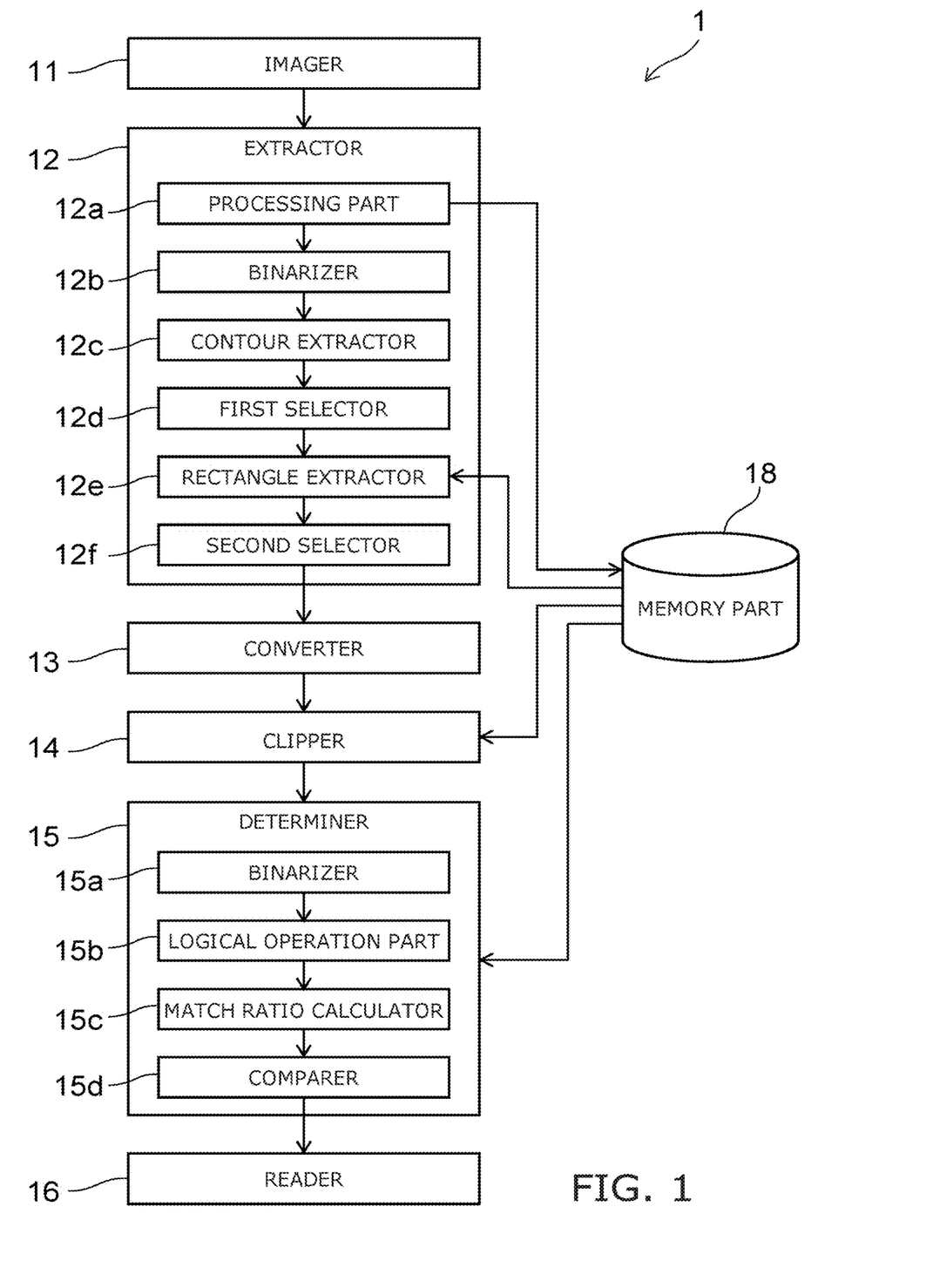
FIG. 1 is a block diagram illustrating a configuration of a reading system according to an embodiment.

FIG. 1 is a block diagram illustrating a configuration of a reading system according to an embodiment.

The reading system according to the embodiment is used to read a numerical value displayed in a segment display from an image including the segment display. In the embodiment, a segment display refers to a display that includes some display information such as a numeral, a character, etc., configured by the display of multiple segments.

As illustrated in FIG. 1, the reading system 1 according to the embodiment includes an imager 11, an extractor 12, a converter 13, a clipper 14, a determiner 15, a reader 16, and a memory part 18.

The imager 11 acquires a static image by imaging a segment display. The imager 11 outputs the acquired image to the extractor 12. When a video image is imaged by the imager 11, the imager 11 cuts out a static image from the video image and outputs the static image to the extractor 12. An object other than a segment display may be imaged in the image.

The extractor 12 extracts a candidate of the image of the segment display from the image that is input. Here, the image that is imaged by the imager 11 and input to the extractor 12 is called the input image. The image that is a portion of the input image and is a candidate of the segment display is called the candidate image. The candidate image is a portion of the input image in which the extractor 12 determines that the segment display is imaged. Multiple candidate images may be output from the extractor 12.

As one specific example, the extractor 12 includes a processing part 12a, a binarizer 12b, a contour extractor 12c, a first selector 12d, a rectangle extractor 12e, and a second selector 12f.

For example, the processing part 12a generates a processed image in which the input image is converted into a grayscale. The processing part 12a outputs the processed image to the binarizer 12b. At this time, for example, the processing part 12a may output, to the binarizer 12b, a processed image in which the input image is reduced to a preset size. At this time, the processing part 12a stores, in the memory part 18, the original-size image that is not reduced.

The binarizer 12b generates a binary image illustrated using white and black by binarizing the processed image that is input. For example, the contour extractor 12c extracts the contour of a region illustrated using white in the binary image.

The first selector 12d calculates the surface area of the region surrounded with the contour. When multiple contours are extracted, the surface area of each region is calculated. The first selector 12d compares each calculated surface area to a prescribed threshold and selects only regions of which the surface area is not less than the threshold. Thereby, regions of which the surface area is too small are excluded from the candidates. The rectangle extractor 12e extracts a rectangle by performing a straight-line approximation of the selected region. For example, the rectangle extractor 12e acquires the coordinates of the vertices of the extracted rectangle.

The second selector 12f compares the extracted rectangular region to a preset condition and selects a region matching the condition. The condition may be, for example, the ratio of the vertical dimension and the lateral dimension of the rectangle being within a prescribed range, the angles of the vertices being within a prescribed range, all vertices of the rectangle not being in the outer frame vicinity of the image (e.g., within three pixels from the outer frame), etc. The second selector 12f outputs the selected rectangle to the converter 13 as a final candidate image.

The converter 13 performs the following first processing and second processing.

In the first processing, the converter 13 determines whether or not the candidate image input from the extractor 12 is distorted. When it is determined that the candidate image is distorted, the converter 13 corrects the distortion so that the candidate image approaches an image that is imaged from the front. In the second processing, the converter 13 determines whether or not the size of the candidate image matches a preset specified size. When the size of the candidate image does not match the specified size, the converter 13 corrects the candidate image so that the size of the candidate image approaches the specified size.

The sequence of performing the first processing and the second processing is arbitrary. Or, the first processing and the second processing may be performed simultaneously. For example, the converter 13 may correct the distortion and the size by simultaneously performing the first processing and the second processing by performing a projective transformation of the candidate image. The converter 13 outputs the corrected candidate image to the clipper 14. When it is determined that the candidate image is not distorted and the size of the candidate image matches the specified size, the converter 13 outputs the input candidate image as-is to the clipper 14.

The clipper 14 refers to the memory part 18. A preset mask and information of the preset mask are stored in the memory part 18. In the embodiment, the mask is an image corresponding to the segment display to be read. The mask is used as reference information when reading the segment display. For example, a binary image of the segment display in the state in which all segments are lit is used as the mask. The clipper 14 acquires, from the memory part 18, the vertical dimension and the lateral dimension of the mask and the corresponding position of the mask in the actual segment display. Based on this information, the clipper 14 cuts out a portion of the candidate image that is input. The clipper 14 outputs the cut-out candidate image to the determiner 15.

The determiner 15 refers to the memory part 18 and calculates a match ratio by using the mask and the candidate image that is input. The match ratio is a value that indicates the certainty that a segment display is included in the candidate image. For example, the likelihood of a segment display being included in the candidate image increases as the match ratio increases.

The determiner 15 compares the match ratio to a preset threshold. When the match ratio is not less than the threshold, the determiner 15 determines that the candidate image is an image of a segment display and outputs the candidate image to the reader 16. When multiple candidate images exist, the determiner 15 performs the calculation of the match ratio and the determination for each candidate image.

Specifically, the determiner 15 includes a binarizer 15a, a logical operation part 15b, a match ratio calculator 15c, and a comparer 15d.

The binarizer 15a binarizes the candidate image. The logical operation part 15b calculates an AND operation of the binary image and the mask. The regions that are illustrated using white in the processed image obtained from the AND operation are only the regions that are illustrated using white in the mask and illustrated using white in the binary image.

The match ratio calculator 15c calculates the agreement ratio of the binary image with respect to the processed image as the match ratio. In other words, a proportion (A2/A1) of a surface area A2 of the regions illustrated using white in the binary image to a surface area A1 of the surface area A1 of the regions illustrated using white (the number of pixels illustrated using white) in the processed image is calculated as the match ratio.

The comparer 15d compares the match ratio to a threshold. When the match ratio is not less than the threshold, the candidate image is output to the reader 16. When the match ratio is less than the threshold, the comparer 15d determines that the candidate image is not an image of a segment display; for example, the processing ends.

The reader 16 reads the numerical value displayed in the segment display from the candidate image that is input. For example, the reader 16 cuts out the numeral from the candidate image that is input and reads the numerical value by detecting the lit segments. For example, the reader 16 causes a monitor to display the numerical value that is read and/or outputs the numerical value to a database.

The memory part 18 stores information necessary for the processing of the reading system 1 and data generated in the processing. For example, other than the mask described above, the thresholds that are compared when performing the determinations, etc., are stored in the memory part 18.

An operation of the reading system 1 according to the embodiment will now be described with reference to FIG. 2 to FIG. 3I.

Figure 2:
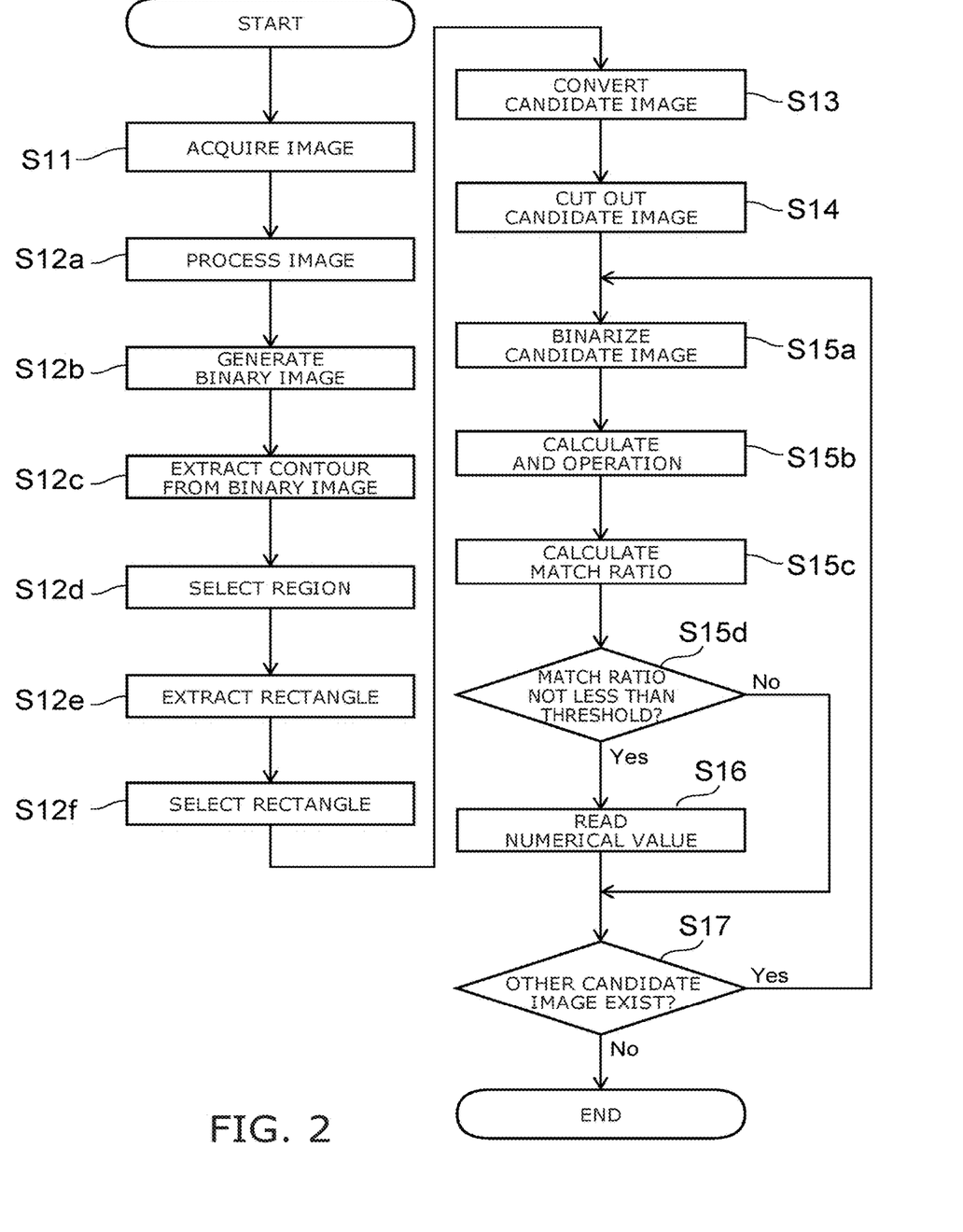
FIG. 2 is a flowchart illustrating the operation of the reading system according to the embodiment.

FIG. 2 is a flowchart illustrating the operation of the reading system according to the embodiment.

FIGS. 3A to 3I illustrate processing according to the reading system according to the embodiment.

Figure 3A:
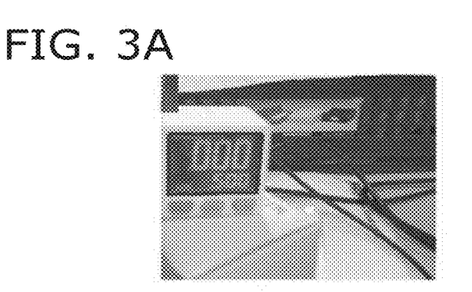
FIGS. 3A to 3I illustrate processing according to the reading system according to the embodiment.
Figure 3B:
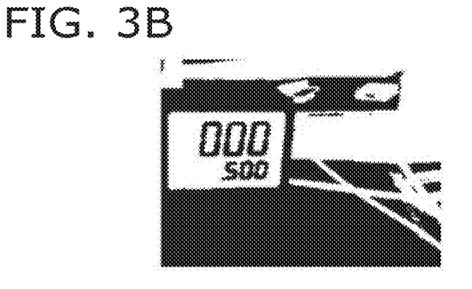

The imager 11 acquires an image by imaging a segment display (step S11 of FIG. 2). The processing part 12a processes the input image (step S12a). A processed image in which the input image is reduced and grayscaled and an original-size image in which only grayscaling of the input image is performed are generated thereby. FIG. 3A is an example of the processed image. The binarizer 12b generates a binary image as illustrated in FIG. 3B by binarizing the processed image (step S12b). The contour extractor 12c extracts a contour of the binary image (step S12c).

Figure 3C:
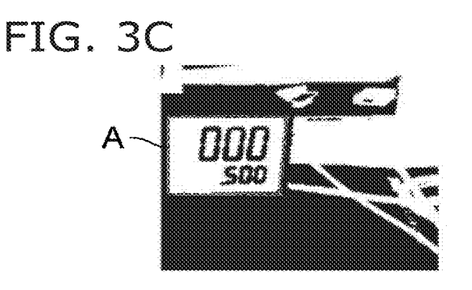
Figure 3D:
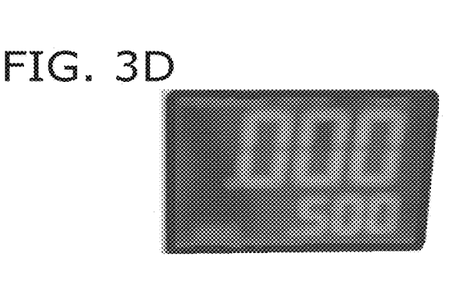

The first selector 12d selects a region surrounded with the contour (step S12d). For example, the region that is surrounded with a frame A as illustrated in FIG. 3C is selected thereby. The rectangle extractor 12e extracts a rectangle from the original-size image based on the extraction result of the rectangle in the selected region (step S12e). The second selector 12f selects the extracted rectangle (step S12f) and outputs the extracted rectangle as a candidate image. FIG. 3D illustrates the rectangle output as the candidate image.

Figure 3E:
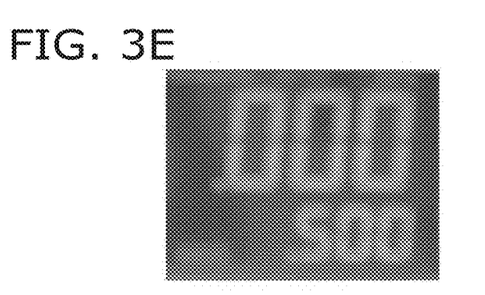
Figure 3F:
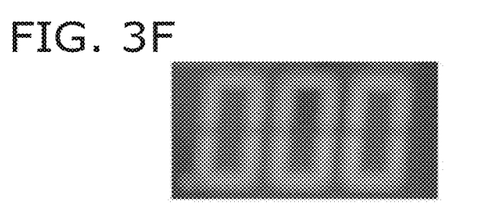

As illustrated in FIG. 3E, the converter 13 converts the candidate image to correct the distortion and the size. For example, the converter 13 corrects the distortion and the size by performing a projective transformation of the candidate image (step S13). FIG. 3H illustrates an example of a mask. The clipper 14 cuts out a portion of the candidate image to match the size of the mask (step S14). The image illustrated in FIG. 3F is obtained thereby.

Figure 3G:
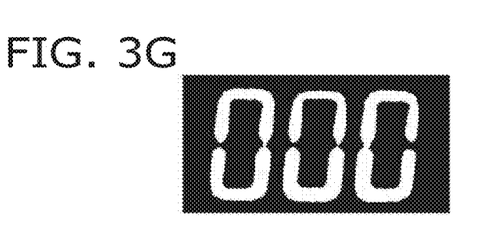
Figure 3H:
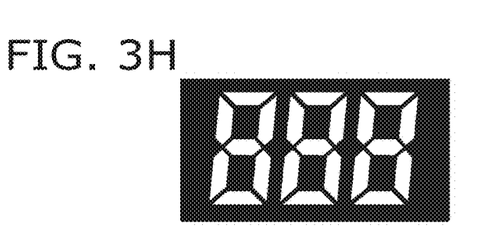
Figure 3I:
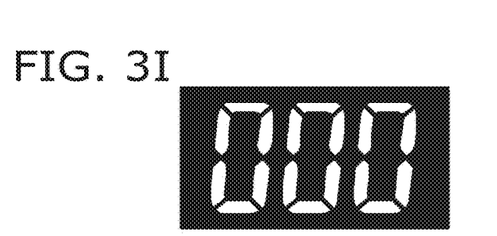

The binarizer 15a binarizes the cut-out candidate image as illustrated in FIG. 3G (step S15a). The logical operation part 15b calculates an AND operation of the binary image and the mask (step S15b). The image illustrated in FIG. 3I is obtained thereby. The match ratio calculator 15c calculates a match ratio by using the images of FIG. 3G and FIG. 3I (step S15c). The comparer 15d compares the match ratio to a preset threshold (step S15*d*). When the match ratio is not less than the threshold, the reader 16 reads the numerical value of the segment display from the candidate image (step S16).

The determiner 15 determines whether or not another candidate image exists for which steps S15*a* to S15*d* have not yet been performed (step S17). When another candidate image exists, step S15*a* is performed for that candidate image. When no other candidate image exists, the processing ends.

Effects of the embodiment will now be described.

As described above, when reading the segment display, a candidate image is extracted from the input image as a candidate of a portion in which a segment display is imaged. Conventionally, for example, a correction of distortion or the like of the extracted candidate image is performed as appropriate, and the numerical value of the segment display is read from the candidate image.

However, for example, there are cases where a displayer that is similar to a segment display is included in the candidate image. In such a case, there is a possibility that an erroneous detection may occur due to reading the numerical value of the other displayer as the numerical value of a segment display.

The reading system 1 according to the embodiment includes the determiner 15 to suppress such an erroneous detection. The determiner 15 uses the candidate image and the preset mask to calculate the match ratio indicating the certainty that a segment display is included in the candidate image. Then, the determiner 15 determines that the candidate image is an image of a segment display when the match ratio is not less than a preset threshold.

By performing such a determination, the reading can be performed for only the candidate images having a higher likelihood of being a segment display. In particular, in the embodiment, a mask that corresponds to the segment display to be read is prepared beforehand, and the candidate images are narrowed down using the mask. Therefore, even when another segment display or a displayer similar to a segment display is included in the input image, only the segment display to be read can be selected with higher accuracy, and the likelihood of an erroneous detection can be greatly reduced.

Although the reading system 1 according to the embodiment includes the imager 11 in the example illustrated in FIG. 1, the reading system 1 may not include the imager 11. For example, an image that is imaged by another imaging device may be input to the reading system 1, and the reading system 1 may read the numerical value of the segment display from the input image.

The reading system 1 may not include the converter 13 and the clipper 14; however, it is desirable for these components to be included to increase the accuracy of the reading.

For example, the accuracy of the match ratio can be increased by the distortion of the candidate image being corrected by the converter 13. Thereby, the candidate image in which the segment display is imaged can be sorted more accurately.

Because the clipper 14 uses the mask to cut out a portion of the candidate image, the subjects other than the subject to be read can be excluded from the candidate image. The accuracy of the match ratio can be increased thereby.

In the description described above, the converter 13 corrects the distortion of the candidate image when it is determined in the first processing that the candidate image is distorted. Instead of this method, the converter 13 may distort the mask to match the distortion of the candidate image when it is determined that the candidate image is distorted in the first processing. In such a case as well, the accuracy of the match ratio in the subsequent processing of the determiner 15 can be increased.

An example is shown in FIGS. 3A to 3I in which a numerical value displayed in a seven-segment display is read by using a mask corresponding to a seven-segment display. However, the segment display that is readable by the reading system 1 according to the embodiment is not limited to a seven-segment display. The segment display to be read may be a fourteen-segment display or a sixteen-segment display.

An image of a segment display in which at least a portion of the multiple segments are lit is used as the mask. More desirably, a binary image of a segment display in which all segments are lit is used as the mask. Thereby, the candidate image in which the segment display is imaged can be selected with higher accuracy regardless of the display information of the segment display to be read.

When a binary image in which all segments are lit is used as the mask, the surface area of the white regions of the mask increase as the segments increase. For example, when the candidate image includes much noise and there are many white regions due to the noise, there is a possibility that the match ratio between the candidate image and the mask may increase even though the candidate image does not include a segment display. Therefore, it is desirable to adjust the threshold that is compared to the match ratio according to the number of segments in the segment display to be read.

For example, when a numerical value of a seven-segment display is read, the candidate image in which the seven-segment display is imaged can be sorted with higher accuracy by setting the threshold to be 0.6 or more.

If the threshold is high, the likelihood of a determination that the image is not of a seven-segment display becomes high even when a seven-segment display is imaged in the candidate image. Therefore, it is desirable for the threshold to be 0.8 or less.

In other words, when reading a numerical value of a seven-segment display, the accuracy of reading the numerical value can be increased by setting the threshold to be not less than 0.6 and not more than 0.8.

The processing of the extractor 12 is modifiable as appropriate as long as the candidate image can be extracted. For example, the processing part 12*a* or the binarizer 12*b* is unnecessary when the size of the input image is small, when the input image is pre-binarized, etc. The processing for extracting the candidate image from the input image also is modifiable as appropriate. Such modifications are described below.

First Modification

Figure 4:
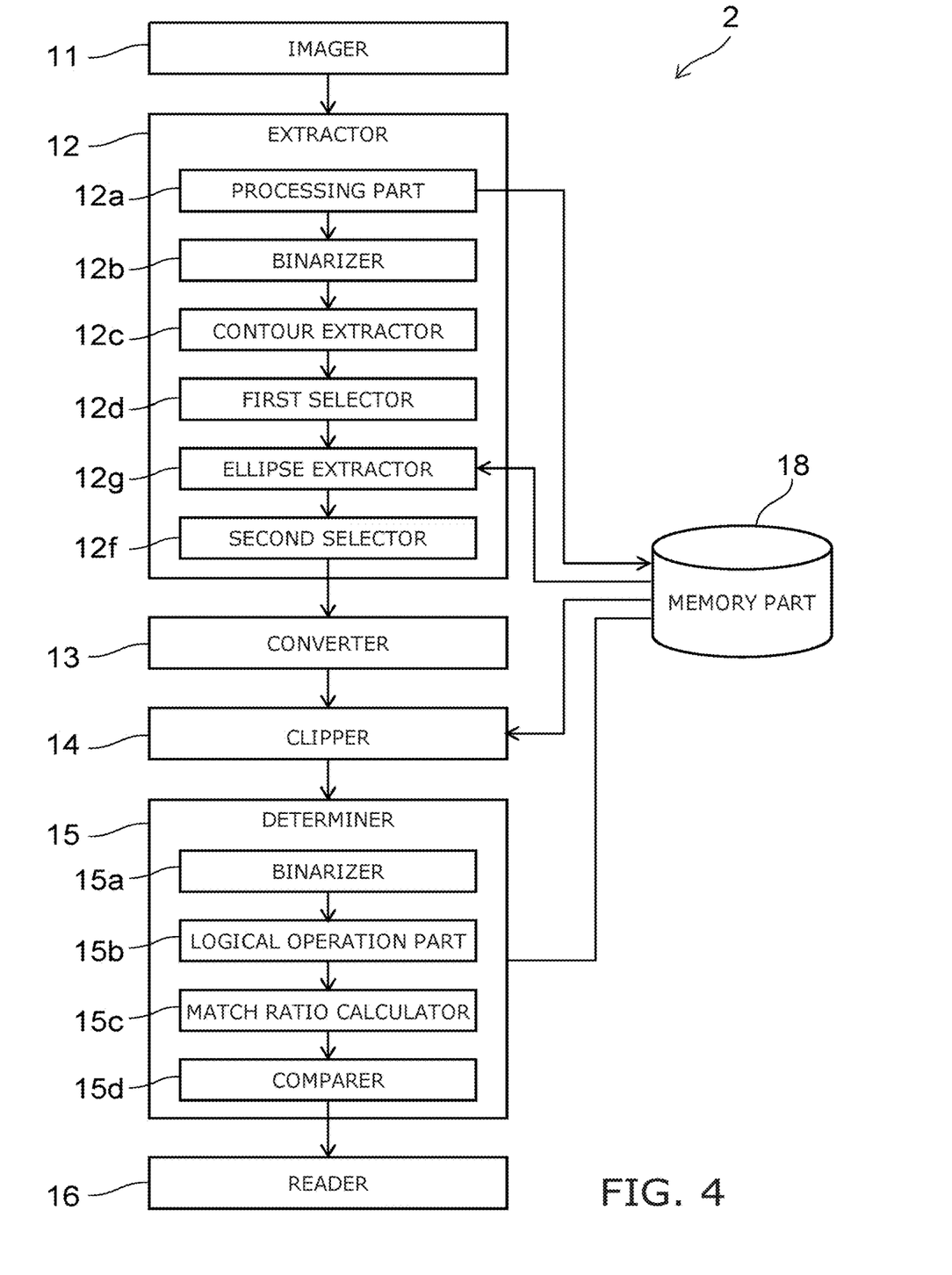
FIG. 4 is a block diagram illustrating a configuration of a reading system according to a first modification of the embodiment.

FIG. 4 is a block diagram illustrating a configuration of a reading system according to a first modification of the embodiment.

In the example of FIG. 1 to FIG. 3I, the frame of the display region of the segment display is rectangular. Therefore, the rectangle extractor 12*e* is provided in the extractor 12 to match the shape of the display region.

When the frame of the display region is circular, an ellipse extractor 12*g* is provided instead of the rectangle extractor 12*e* in the extractor 12 as in the reading system 2 illustrated in FIG. 4. The ellipse extractor 12*g* extracts an ellipse from the region selected by the first selector 12*d*. At this time, the ellipse extractor 12*g* acquires the coordinates of the extracted ellipse. The ellipse extractor 12*g* extracts the image of an ellipse corresponding to the coordinates recited above from the original-size image and outputs the extracted image to the second selector 12f.

The second selector 12f selects an ellipse that matches a preset condition by comparing the image of the ellipse that is input to the preset condition. For example, the flattening of the ellipse, the distribution of the luminance, etc., are used as the condition. The second selector 12f outputs the image of the selected ellipse as the candidate image to the converter 13. Thereafter, the processing is similar to that of the example described in reference to FIG. 1 to FIG. 3I. In other words, the converter 13 corrects the distortion of the candidate image, and the clipper 14 cuts out a portion of the candidate image. Then, after the determination by the determiner 15, the numerical value of the segment display is read by the reader 16.

Generally, the numerical values of the segment display are arranged in a prescribed direction. Accordingly, generally, the numerical values that are displayed in the segment display fit within a rectangle even when the frame of the display region of the segment display is a circle or an ellipse. In other words, the exterior form of the mask is set to a rectangle even when the frame of the display region is a circle or an ellipse. By setting the exterior form of the mask to be a rectangle, the proportion of the surface area in which the numerical value is displayed to the total surface area of the mask can be increased. As a result, the effects on the match ratio of the noise in the candidate image, etc., can be reduced, and the accuracy of the match ratio can be increased.

Second Modification

Figure 5:
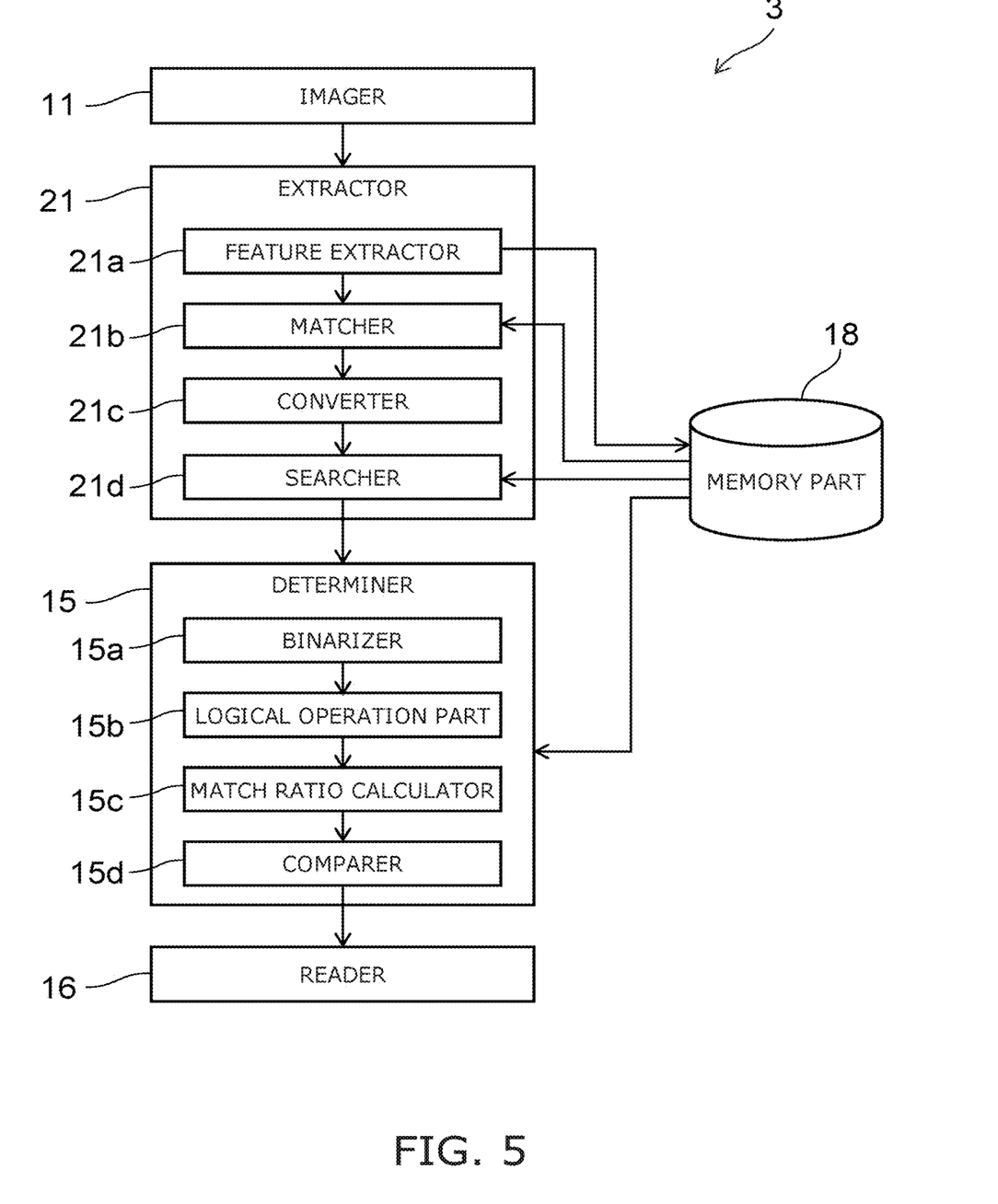
FIG. 5 is a block diagram illustrating a configuration of a reading system according to a second modification of the embodiment.

FIG. 5 is a block diagram illustrating a configuration of a reading system according to a second modification of the embodiment.

Compared to the reading system 1, the reading system 3 illustrated in FIG. 5 includes an extractor 21 instead of the extractor 12, the converter 13, and the clipper 14.

In the reading system 3, before reading the numerical value of the segment display, only segment displays that are objects of the reading are imaged from the front by the imager 11. Here, the images in which only the segment display is imaged from the front are called template images.

The extractor 21 includes a feature extractor 21a, a matcher 21b, a converter 21c, and a searcher 21d.

The feature extractor 21a extracts a feature of the input image. The feature extractor 21a extracts features of template images by referring to the template images stored in the memory part 18. Or, the features of the template images may be pre-extracted by the feature extractor 21a and stored in the memory part 18. In such a case, the feature extractor 21a refers to the features of the template images stored in the memory part 18. The feature extractor 21a outputs the feature of the input image and the features of the template images to the matcher 21b.

The matcher 21b calculates a correction amount of the input image necessary for matching the feature of the input image to the features of the template images. For example, the matcher 21b calculates the correction amount necessary to cause the distorted segment display of the input image to approach an image that is imaged from the front. The matcher 21b outputs the calculated correction amount and the input image to the converter 13.

When the features cannot be matched to each other, the likelihood is high that a segment display is not included in the input image. Accordingly, in such a case, for example, the processing ends without calculating the correction amount.

The converter 21c converts the input image based on the correction amount that is input. Thereby, when the input image is distorted with respect to the template image, the distortion is corrected.

The searcher 21d refers to the template images stored in the memory part 18. Then, the searcher 21d searches for portions in the input image that match the template images. The searcher 21d outputs the matching portions as candidate images to the determiner 15.

Thereafter, the processing of the determiner 15 and the reader 16 is similar to that of the reading system 1 illustrated in FIG. 1.

For example, the extraction of the feature by the feature extractor 21a is performed using KAZE, AKAZE (Accelerated KAZE), SIFT (Scale-invariant feature transform), etc. For example, the matching by the matcher 21b is performed using KNN (K Nearest Neighbor), FLANN (Fast Library for Approximate Nearest Neighbors), etc. For example, the searching by the searcher 21d is performed using pattern matching based on the similarity between the images.

For example, when multiple segment displays are provided on some plane and these segment displays are imaged, the segment displays are distorted in the same way in the input image. In the reading system 3 according to the modification, conversion of the input image using the feature and matching using the template images are performed. Namely, the entire region of the input image is converted. Therefore, it is unnecessary to correct the distortion of each candidate image, and the processing can be faster compared to the reading system 1 when multiple segment displays exist in the same plane, etc.

Third Modification

Figure 6:
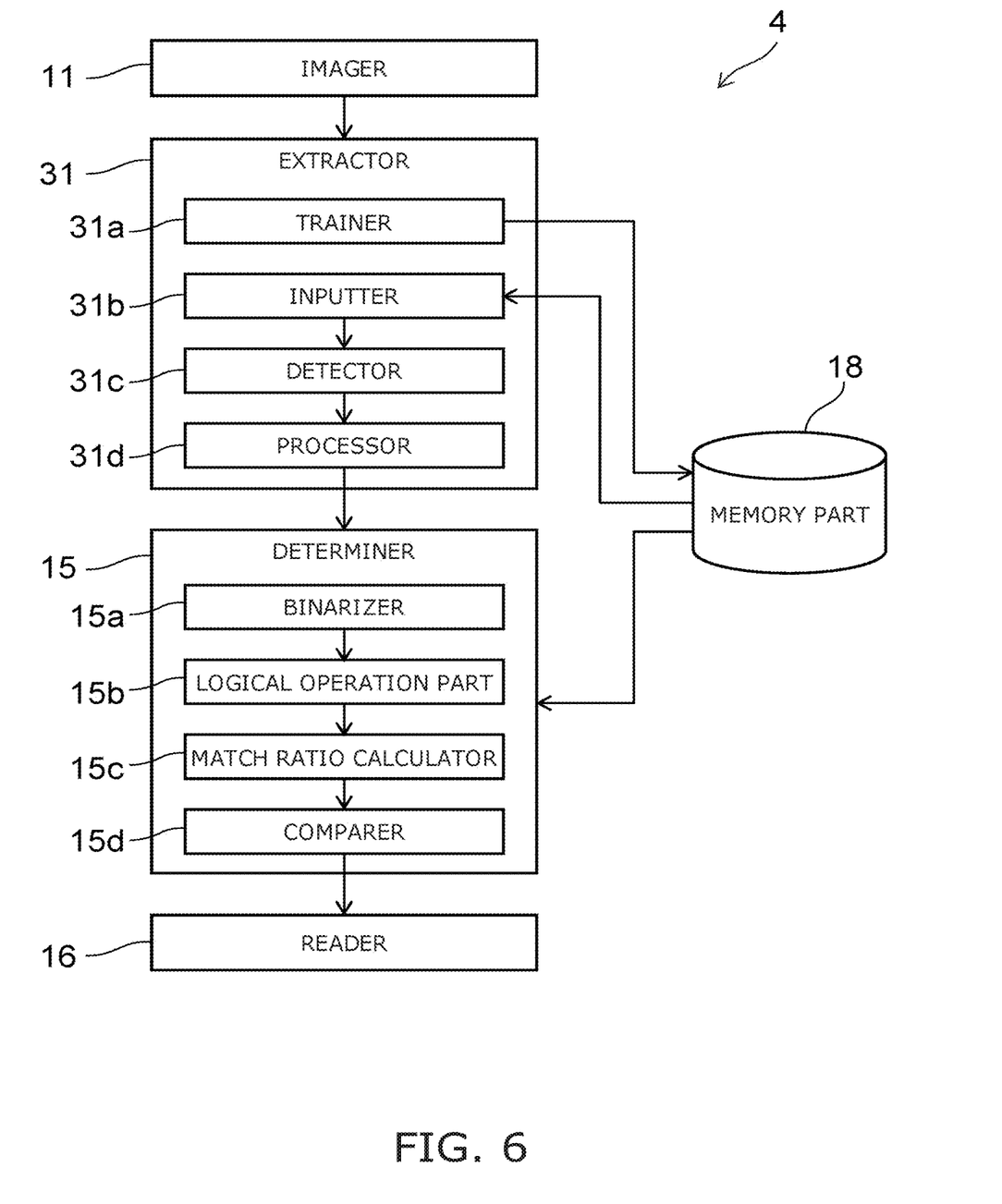
FIG. 6 is a block diagram illustrating a configuration of a reading system according to a third modification of the embodiment.

FIG. 6 is a block diagram illustrating a configuration of a reading system according to a third modification of the embodiment.

Compared to the reading system 1, the reading system 4 illustrated in FIG. 6 includes an extractor 31 instead of the extractor 12, the converter 13, and the clipper 14. The extractor 31 includes a trainer 31a, an inputter 31b, a detector 31c, and a processor 31d.

In the reading system 4, the candidate image in which the segment display is imaged is extracted from the input image by using a neural network. For example, teacher data is input to the extractor 31 beforehand, and the neural network is trained. The teacher data includes, for example, distorted images including segment displays, data of the positions of the segment displays in the images, and the distortion amounts of the images.

The trainer 31a trains the neural network so that when image data is input, neurons respond (fire) for the data of the portions where the segment display is imaged, and neurons that correspond to the distortion amount of the image respond. The trainer 31a stores the trained neural network in the memory part 18. The training by the trainer 31a recited above may be performed by a processing device that performs the processing of the determiner 15 and/or the reader 16 or by another processing device. Favorably, the training recited above is performed by a processing device having faster calculation performance.

Subsequently, an image for reading the numerical value of the segment display is acquired by the imager 11, and the image is input to the extractor 31. When the image is input, the inputter 31b refers to the trained neural network stored in the memory part 18. Then, the inputter 31b inputs the data of the image to the neural network.

The detector 31c detects the responses of the neurons if the neurons respond while the image data is input to the neural network. The detector 31c detects the coordinates and the distortion amount of the image for which the neurons responded, and outputs the coordinates and the distortion amount to the processor 31d.

The processor 31d extracts a candidate image from the input image based on the coordinates that are input. The processor 31d corrects the distortion of the candidate image based on the distortion amount that is input. The processor 31d outputs the corrected candidate image to the determiner 15.

The sequence of performing the extraction of the candidate image and the correction of the distortion can be modified as appropriate. For example, in the processor 31d, the candidate image may be extracted after the distortion of the input image is corrected.

Thereafter, the processing of the determiner 15 and the reader 16 is similar to that of the reading system 1 illustrated in FIG. 1.

In the reading system 3 according to the modification, the cut out and/or the correction of the image is performed using a neural network. Therefore, the candidate image can be extracted with higher accuracy even when it is difficult to extract the contour from the binarized image because the contrast ratio of the display region of the segment display and the outer frame of the display region is not large. Accordingly, compared to the reading system 1, it is possible to read the numerical value of the segment display in the input image with higher accuracy.

Figure 7:
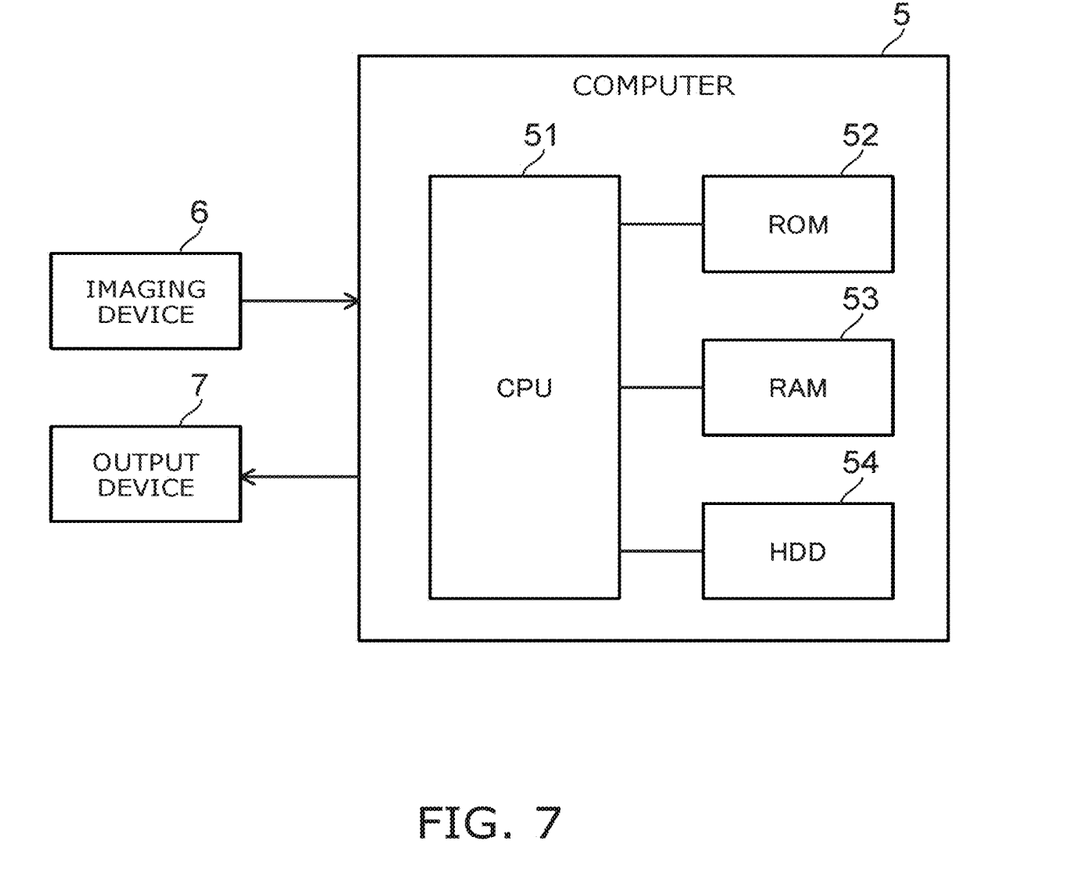
FIG. 7 is a block diagram illustrating a hardware configuration for realizing the reading systems according to the embodiments.

FIG. 7 is a block diagram illustrating a hardware configuration for realizing the reading systems according to the embodiments.

For example, the reading systems according to the embodiments include a reading device 5 and an imaging device 6 illustrated in FIG. 7. The reading device 5 is, for example, a computer and includes ROM (Read Only Memory) 51, RAM (Random Access Memory) 52, a CPU (Central Processing Unit) 53, and a HDD (Hard Disk Drive) 54.

The ROM 51 stores programs controlling the operations of the computer. The ROM 51 stores programs necessary for causing the computer to function as the extractor, the converter, the clipper, the determiner, the reader, the searcher, etc., of the embodiments described above.

The RAM 52 functions as a memory region where the programs stored in the ROM 51 are loaded. The CPU 53 reads a control program stored in the ROM 51 and controls the operation of the computer according to the control program. The CPU 53 loads various data obtained by the operation of the computer into the RAM 52. The HDD 54 functions as the memory part 18 of the embodiments described above and stores information necessary for reading, and information obtained in the reading process.

When the reading system 4 that utilizes a neural network is realized using the reading device 5, the reading device 5 also may include a GPU (Graphics Processing Unit) and/or a dedicated chip specifically for the processing of the neural network. Instead of the HDD 54, the reading device 5 may include an eMMC (embedded Multi Media Card), a SSD (Solid State Drive), a SSHD (Solid State Hybrid Drive), etc.

The imaging device 6 images the subject (the segment display) and transmits the acquired image to the reading device 5. The imaging device 6 is, for example, a camera.

An output device 7 outputs the data (the numerical value of the segment display that is read) output from the reading device 5 so that the user can recognize the data. The output device 7 is, for example, a monitor, a printer, a speaker, etc.

For example, the reading device 5, the imaging device 6, and the output device 7 are connected to each other by a wired or wireless technique. Or, these devices may be connected to each other via a network. Or, at least two of the reading device 5, the imaging device 6, or the output device 7 may be embedded in one device. For example, the reading device 5 may be embedded in an integral body with an image processor of the imaging device 6, etc.

An embodiment of the invention includes the following program.

A program causing a computer to:
  extract a candidate image from an input image, the candidate image being a candidate of a portion in which a segment display is imaged;
  use the candidate image and a preset mask to calculate a match ratio indicating a certainty of a segment display being included in the candidate image, and determine that the candidate image is an image of a segment display when the match ratio is not less than a preset threshold; and
  read a numerical value displayed in a segment display from the candidate image determined to be an image of a segment display.

By using the reading systems and the reading methods according to the embodiments described above, a numerical value that is displayed in a segment display can be read with higher accuracy. Similarly, a numerical value that is displayed in a segment display can be read by a computer with higher accuracy by using a program for causing the computer to operate as the reading system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A processor, comprising:
  a first processing circuitry,
    using a candidate image and a mask image to calculate a match ratio indicating a certainty of a segment display being included in the candidate image, the candidate image being extracted from an input image, the candidate image being a candidate of a portion of the input image in which the segment display is imaged, the segment display including a plurality of segment groups, each of the segment groups including a plurality of segments and displaying a number, the mask image being a binary image and including a plurality of mask regions for the segment groups,
    determining that the candidate image is an image of a segment display in a case where the match ratio satisfies a first condition;
  a second processing circuitry
    extracting a contour from the input image,
    calculating a surface area of a region surrounded with the contour, extracting, based on the contour, an image having a prescribed shape from the input image when the surface area is not less than a threshold, the threshold being preset, and outputting, as the candidate image, the extracted image satisfying a second condition; and a third processing circuitry reading a numerical value displayed by the segments groups from the candidate image determined to be an image of the segment display.

2. The processor according to claim 1, wherein a number of the mask regions is same as a number of the segment groups.

3. The processor according to claim 1, wherein the segment groups are arranged in a first direction at a first pitch on the segment display, and
the mask regions are arranged in the first direction at the first pitch.

4. The processor according to claim 3, wherein a length in the first direction of the segment display is longer than a length in a second direction of the segment display,
the second direction is perpendicular to the first direction, and
a length in the first direction of the mask image is longer than a length in the second direction of the mask image.

5. The processor according to claim 1, wherein a size of the candidate image is same as a size of the mask image.

6. The processor according to claim 1, wherein in one of the segment groups, the segments are away from each other.

7. The processor according to claim 1, wherein the segment display is a seven-segment display, a fourteen-segment display, or a sixteen-segment display.

8. The processor according to claim 1, wherein the mask image is a binary image of the segment display in which all of the segments in the segment groups are lit.

9. The processor according to claim 1, further comprising a fourth processing circuitry,
the fourth processing circuitry performing at least
first processing of converting, when the candidate image is distorted, the candidate image to approach an image that is imaged from a front, and
second processing of correcting a size of the candidate image to approach a size of the mask,
the first processing circuitry calculating the match ratio by using the mask image and the converted candidate image.

10. The processor according to claim 1, further comprising a fourth processing circuitry,
the fourth processing circuitry performing at least
first processing of distorting the mask image to match a distortion of the candidate image when the candidate image is distorted, and
second processing of correcting a size of the candidate image to approach a size of the mask,
the first processing circuitry calculating the match ratio by using the mask image and the converted candidate image.

11. The processor according to claim 1, further comprising:
a fifth processing circuitry cutting out a portion of the candidate image based on a size and a shape of the mask image,
the first processing circuitry calculating the match ratio by using the cut-out candidate image.

12. A processing system, comprising:
the processor according to claim 6, and
an imager acquiring the input image by imaging a segment display,
the imager sending the input image to the second processing circuitry.

13. The processor according to claim 1, wherein the first processing circuitry
binarizes the candidate image,
calculates an AND operation by overlaying the mask and the binarized candidate image, and
calculates, as the match ratio, an agreement ratio between the candidate image and an image obtained from the AND operation.

14. A reading method, comprising:
extracting a contour from an input image;
calculating a surface area of a region surrounded with the contour;
extracting, based on the contour, an image having a prescribed shape from the input image when the surface area is not less than a threshold, the threshold being preset;
outputting, as a candidate image, the extracted image satisfying a second condition, the candidate image being a candidate of a portion of the input image in which a segment display is imaged, the segment display including a plurality of segment groups, each of the segment groups including a plurality of segments and displaying a number;
using the candidate image and a mask image to calculate a match ratio indicating a certainty of the segment display being included in the candidate image, the mask image being a binary image and including a plurality of mask regions for the segment groups;
determining that the candidate image is an image of a segment display in a case where the match ratio satisfies a first condition; and
reading a numerical value displayed by the segments groups from the candidate image determined to be an image of the segment display.

15. A non-transitory computer-readable storage medium storing a program,
the program causing a computer to perform the reading method according to claim 14.

* * * * *